UNITED STATES PATENT OFFICE.

MOSES M. MATHEWS, OF ROCHESTER, NEW YORK.

USE OF ROSIN-OIL IN PRINTER'S INK.

Specification forming part of Letters Patent No. 7,686, dated October 1, 1850.

*To all whom it may concern:*

Be it known that I, MOSES M. MATHEWS, of Rochester, in the county of Monroe and State of New York, have invented a new and useful Improvement in the Manufacture of Printing-Ink, of which the following is a full, clear, and exact description.

My improvement consists in the employment of "rosin-oil" in connection with other ingredients in the manufacture of printing-ink.

Before using the rosin-oil I subject it to a process by which it is deprived of its peculiar odor. This may be effected in one of two ways.

The first consists in heating the oil to the boiling-point and in adding to it while at that temperature a quantity of chloride of lime, of which from four to eight ounces are required for each gallon of oil, according to the pungency of the odor. After a sufficient quantity of chloride of lime has been added the boiling is continued until the water contained in the chloride of lime is evaporated, when the purified oil is fit for use.

The second method of purifying the rosin-oil consists in agitating it with an equal quantity of water which has been saturated with chloride of lime. By this operation a saponaceous compound is formed which floats upon the surface of the water. The latter is drawn off and the saponaceous compound is boiled until all the water is evaporated, when the oil is ready for use.

The two processes thus described produce about the same result, and either may be used, as expediency may dictate.

In preparing black printing-ink I use the following ingredients in the following proportions, viz.: rosin-oil, one gallon; brown rosin, seven pounds; yellow rosin-soap, two pounds; Prussian blue, indigo, Indian red, each an ounce and a half; best refined lamp-black, three ounces and three drams. I dissolve the rosin in the rosin-oil by the aid of heat. When the rosin is all dissolved the soap previously cut into thin slices is gradually added until it is all dissolved. As soon as the above ingredients are thoroughly incorporated the mixture is removed from the fire and allowed to cool to a temperature not exceeding 100°. The indigo, Prussian blue, and Indian red, previously pulverized and mixed, are now added, and the mixture is thoroughly stirred to render it homogeneous. The lamp-black is then stirred in and the mixture is ground in a paint-mill, after which it may be put up in suitable vessels for the market.

To make blue printing-ink I use the following ingredients, viz.: rosin-oil, one gallon; white or yellow rosin, eight pounds; white bar-soap, two and a quarter pounds; Prussian blue, four pounds. The rosin and soap are dissolved in the rosin-oil, and the mixture is allowed to cool in the same manner as that described for preparing black ink. The Prussian blue, previously pulverized, is then thoroughly incorporated with the mixture by stirring or otherwise, and the whole is ground in a paint-mill.

In making red printing-ink the following ingredients are used, viz.: rosin-oil, one gallon; white or yellow rosin, eight pounds; white bar-soap, two pounds; Chinese vermilion, ten pounds; (lemon) chrome-yellow, two pounds and four ounces. The rosin and soap are dissolved in the rosin-oil in the same manner as indicated in the preparation of black ink. The mixture is then allowed to cool down to a temperature not exceeding 50°, and the vermilion and chrome-yellow, previously pulverized and intimately mixed, are thoroughly incorporated with the mixture by stirring, after which the whole is ground in a paint-mill moved with a slow motion.

The several ingredients above specified may be prepared and compounded in a manner different from those above described; but as those are the best methods with which I am acquainted I have deemed it unnecessary to describe others.

In manufacturing printing-ink it may be found best to vary both the proportions of the rosin-oil and the proportions and nature of the other ingredients combined therewith, and I intend so to do as circumstances may render expedient.

What I claim as my invention, and desire to secure by Letters Patent, is—

The employment of rosin-oil in the manufacture of printing-ink, substantially as herein set forth.

MOSES M. MATHEWS.

Witnesses:
RICHARD H. WELLS,
E. M. MATHEWS.